United States Patent [19]

Monte et al.

[11] Patent Number: 5,064,799

[45] Date of Patent: Nov. 12, 1991

[54] COMPONENTS AND CATALYSTS FOR THE POLYMERIZATION OF OLEFINS

[75] Inventors: Antonio Monte; Luciano Noristi, both of Ferrara, Italy

[73] Assignee: Himont Incorporated, Wilmington, Del.

[21] Appl. No.: 637,407

[22] Filed: Jan. 4, 1991

[30] Foreign Application Priority Data

Jan. 10, 1990 [IT] Italy ............................... 19030 A/90

[51] Int. Cl.$^5$ ............................................. C08F 4/651
[52] U.S. Cl. ..................................... 502/115; 502/116; 502/120; 502/126; 502/127; 526/124
[58] Field of Search ............... 502/115, 116, 120, 126, 502/127

[56] References Cited

U.S. PATENT DOCUMENTS 4,263,168 4/1981 Rochefort et al. ............. 502/115 X
4,971,937 11/1990 Albizatti et al. .................... 502/126

*Primary Examiner*—Patrick P. Garvin

[57] ABSTRACT

Disclosed are catalyst components for the polymerization of olefins comprising the product of the reaction of a tetravalent titanium halide or alkoxy titanium halide and an electron-donor compound with a solid obtained by the reaction of a metal oxide containing surface hydroxyls, preferably together with chemically uncombined water, with an organometallic magnesium compound used in a quantity which does not cause reduction of the titanium in the subsequent reaction with the tetravalent titanium compound.

10 Claims, No Drawings

COMPONENTS AND CATALYSTS FOR THE POLYMERIZATION OF OLEFINS

The present invention concerns catalyst components for the (co)polymerization of CH$_2$=CHR olefins, where R is hydrogen or a 1-6 carbon linear or branched alkyl radical or an aryl radical, and the catalysts obtained therefrom.

Catalysts for the polymerization of olefins obtained by impregnating a metal oxide containing surface hydroxyls, such as silica and alumina, with an organometallic compound, preferably an Al-trialkyl or Mg-dialkyl compound, used in molar excess with respect to the surface hydroxyls, and subsequently reacting the support with titanium tetrachloride are known (GB1,256,851 and 1,306,044). The catalysts are suited for the polymerization of ethylene; however, they do not give sufficiently high yields (300-500 g polymer/g catalyst component per hour and operating with an ethylene pressure of 10 atm).

Should the catalysts be modified with electron-donor compounds in order to render them stereospecific and thus suited for stereoregular polymerization of propylene or other alpha olefins, one can expect a considerable reduction in activity, which is already not too high in the polymerization of ethylene.

In U.S. Pat. No. 4,263,168 catalyst components for the polymerization of propylene and other alpha-olefins obtained by reacting a metal oxide containing surface hydroxyls (silica, alumina, etc.) with an organometallic magnesium compound of the formula MgR$_{(2-x)}$X$_x$ (where R is a hydrocarbyl radical; X is a halogen; x is a number from 0.5 to 1.5), and subsequent reaction of the oxide first with an electron-donor compound, and then with titanium tetrachloride are disclosed. The organometallic magnesium compound is reacted in molar excess with respect to the hydroxyl groups, while the electron-donor compound is used in quantities up to 1 mole per mole of reacted magnesium compound, preferably 0.5-0.8 moles. The reaction with TiCl$_4$ is carried out by using an excess of TiCl$_4$.

In one embodiment the metal oxide, either before or after the reaction with the organometallic magnesium compound, is reacted with a halogenating agent in such a quantity as to supply at least one halogen atom per hydroxyl group. The halogenating agent can also be added during the reaction with the electron-donor compound. The activity and sterospecificity of these catalysts are not sufficiently high, i.e. capable of rendering them attractive for use on an industrial scale.

The high activity of the catalysts based on magnesium halides supported on metal oxides, combined with a good stereospecificity, not only reduce the content of undesired halogenated compounds which remain in the polymer, but also enables to control, in a relatively simple manner, the morphology of the polymer. In the modern industrial production processes of polyolefins, there is a need for catalysts capable of producing a polymer with controlled morphologic characteristics, such as narrow particle size and sufficiently high bulk density.

This invention provides catalyst components for the polymerization of CH$_2$=CHR olefins, where R is a hydrogen, or a 1-6 carbon linear or branched alkyl radical or an aryl radical, having very high activity and stereospecificity. Said catalyst components comprise the reaction product of a tetravalent titanium halide or alkoxy titanium halide and an electron-donor compound with a solid obtained by the reaction of a metal oxide containing surface hydroxyls, preferably together with chemically uncombined water, with an organometallic magnesium compound of the formula:

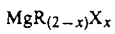

$$MgR_{(2-x)}X_x$$

where R is a C$_{1-20}$ alkyl, C$_{3-20}$ cycloalkyl, C$_{6-20}$ aryl, C$_{7-20}$ aralkyl or alkaryl radical, X is a halogen, OR or COX' group where R is as previously defined, X' is halogen, x is a number from 0.5 to 1.5, used in quantities and under conditions such as not to cause reduction of the titanium during the reaction with the tetravalent titanium compound. Suitable halogens include chlorine and bromine.

The amount of organometallic magnesium compound which under the reaction conditions indicated below, does not cause reduction of the tetravalent titanium compound, is equal to the stoichiometric quantity (1 mole) of magnesium compound per OH group or per mole of water or higher. In the case of magnesium compounds such as methyl magnesium chloride or bromide dissolved in diethyl ether or tetrahydrofuran it is possible to use up to about 2 moles of magnesium compound. In the case of compounds, such as butyl, isoamyl, n-octyl magnesium chloride or bromide it is possible to use up to 10 moles per mole of OH groups or of water.

The expression "no reduction of titanium" means that at least 80% of the titanium present in the solid after the reaction with titanium tetrachloride and with the electron-donor compound is in the tetravalent state.

Operating under conditions where there is a reduction of the titanium, using, for example, an excess of organometallic magnesium compound, the activity and stereospecificity of the catalyst are considerably reduced. It is unexpected that the catalysts of this invention would have high activity and stereospecificity even when the metal oxides contain chemically uncombined water. In fact water is rigorously excluded from the oxides in the processes used up to now for the preparation of olefin polymerization catalysts which use said oxides. Another unexpected aspect of the catalysts of this invention is the fact that they are very active in the polymerization of propylene and similar alpha-olefins, but not in the polymerization of ethylene.

The metal oxides which can be used for the preparation of the catalyst components include silica, alumina, magnesium oxide and magnesium silicate, titanium oxide, thorium oxide, mixed silica-alumina oxides containing minor amounts of alumina. Silica, alumina, and mixed silica-alumina oxides are the preferred oxides. Said oxides contain surface hydroxyls in an amount of from 1 to 3 mmoles, and more, per g of oxide. Preferably, in addition to the hydroxyl groups, chemically uncombined water is also present in quantities up to 0.015 moles per g of oxide. The oxides generally have a surface area (BET) higher than 30 m$^2$/g, particularly between 100 and 500 m$^2$/g, and porosity (measured with nitrogen) from 0.5 to 3.5 cc/g.

The chemically uncombined water can be removed by submitting the oxides to heat at temperatures between 150° and 250° C.

The quantity of OH groups is regulated by submitting the oxides to heat at temperatures between 150° and 800° C. The higher the temperature, the smaller the content of hydroxyl groups present.

The chemically uncombined water is added in a variety of ways; one of the preferred ones consists in allowing a damp nitrogen current to flow over the oxide. Optionally the oxide may be previously treated to render it anhydrous.

The amount of OH groups is preferably from 1 to 3 moles per gram of oxide and the water, when present, is preferably in amount from 1 to 10 mmoles per gram of oxide.

The amount of OH groups present in the metal oxide is determined by titration according to the method described in J. Phys. Chem., 66, 800 (1962), and the amount of water present with the Fisher reagent.

The magnesium organometallic compound can be used uncomplexed or in the form of a complex with electron-donor compounds, such as ethers, particularly diethyl ether and tetrahydrofuran.

In general the quantity of complexing agent complexed with the magnesium compound is from 0.5 to 3 moles, and preferably from 0.5 to 1 mole per mole of magnesium compound.

Examples of magnesium organometallic compounds are: methylmagnesium chloride, methylmagnesium bromide, n-butylmagnesium chloride, isobutylmagnesium chloride, isoamylmagnesium chloride, n-octylmagnesium chloride, n-propylmagnesium bromide, n-butylmagnesium ethoxide and ethylmagnesium methoxide.

The reaction between the metal oxide and the magnesium organometallic compound is carried out at temperatures generally from 0° C. to 100° C. in an inert hydrocarbon medium. After the reaction is completed, the solid is preferably separated and washed with hexane, heptane, or other similar hydrocarbons. However, it is possible to also use the resulting suspension without separating the solid.

The preferred technique is to add the magnesium organometallic compound solution dropwise to a suspension of the metal oxide in hexane, heptane, and similar hydrocarbons.

After the treatment with the magnesium organometallic compound, the metal oxide is reacted with the tetravalent titanium compound and the electron-donor compound. Preferably the titanium compound is titanium tetrachloride, and the reaction is carried out using the tetrachloride itself as the reaction medium. The reaction is carried out at a temperature between 40° and 135° C. for a period from 0.25 to 1 hour or more. After the reaction is complete the excess TiCl$_4$ is separated hot and the solid is washed repeatedly with a hydrocarbon hexane until all chlorine ions have disappeared from the wash. It is preferred to repeat the treatment with TiCl$_4$ one or more times, and the solid washed as indicated above.

The reaction with the electron-donor compound is carried out at the same time as the one with the titanium compound. In the case of TiCl$_4$, the electron-donor compound is dissolved in the TiCl$_4$ excess, and the solution is reacted with the metal oxide. The amount of electron-donor compound is between 0.1 and 1.5 moles per g-atom of Mg, preferably between 0.2 and 0.4 moles.

The electron-donor compound can also be reacted before or after the reaction with the titanium compound. When it is reacted after, the reaction should be carried out in an aromatic hydrocarbon medium, such as benzene and toluene, using equimolar amounts of electron-donor compound with respect to the titanium compound fixed on the metal oxide.

The best results are obtained, however, by reacting the electron-donor compound before or at the same time as the titanium compound.

Any electron-donor compound capable of forming complexes with the magnesium halides and/or the tetravalent titanium halides can be used for the preparation of the catalyst component of this invention. Examples of compounds that can be used are the ethers, esters, ketones, lactones or compounds containing N, P and/or S atoms. Preferred compounds are the esters of dicarboxyl aromatic acids, such as phthalic acid, and the esters of malonic, pivalic, succinic, and carbonic acids. Particularly suitable are the ethers described in U.S. Pat. No. 4,971,937 having the formula:

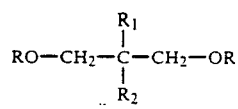

where R, R$_1$, and R$_2$, are the same or different and are linear or branched C$_{1-18}$ alkyl groups, C$_{3-18}$ cycloalkyl or C$_{6-18}$ aryl groups, C$_{7-18}$ alkaryls or aralkyls, and R$_1$ or R$_2$ can also be hydrogen. Particularly, R is a methyl and R$_1$ and R$_2$, are the same or different and are ethyl, propyl, isopropyl, butyl, isobutyl, tert-butyl, neopentyl, isopentyl, phenyl, benzyl, or cyclohexyl.

Specific ethers are diisobutyl, dioctyl and diphenylphthalate, benzyl-butylphthalate, diisobutyl and diethylmalonate, ethylpivalate, ethyl-phenylcarbonate, diphenylcarbonate.

Representative ethers are 2,2-diisobutyl-1,3-dimethoxypropane, 2-isopropyl-2-isopentyl-1,3-dimethoxypropane, 2,2-bis(cyclohexylmethyl)-1,3-dimethoxypropane, 2,2-bis(cyclohexyl)-1,3-dimethoxypropane.

After the treatment with the magnesium compound the metal oxides have a Mg content is from 0.5 to 20% by weight and, the solid catalyst components have a Mg/Ti molar ratio of from 0.5 to 8.

The electron-donor compound is generally present in quantities from 5 to 20%, and in particular from 10 to 15% in moles per g-atoms of magnesium. The total quantity of magnesium halide, titanium halide or alkoxy titanium halide, and electron-donor compound present in the solid catalyst component is from about 5 to 60% by weight.

The surface area (B.E.T.) of the solid catalyst component is generally greater than 100 m$^2$/g, preferably from 100 to 300 m$^2$/g.

The solid catalyst components form, with Al-alkyl compounds, preferably Al-trialkyls, catalysts suitable for the polymerization of CH$_2$=CHR olefins where R is hydrogen, a 1–6 carbon linear or branched alkyl radical or an aryl radical, and mixtures thereof optionally containing small proportions of a diene.

Representative Al-trialkyl compounds are Al-triethyl, Al-triisobutyl, Al-tri-n-butyl, and linear or cyclic compounds containing two or more Al atoms bridged with O or N atoms, or SO$_4$ and SO$_3$ groups.

AlR$_2$OR' and AlR$_2$H compounds where R' is an aryl radical substituted in position 2 and/or 6 with alkyl radicals, preferably branched, having three or more carbon atoms, such as isopropyl, t-butyl, isoamyl and neopentyl, and R is a 1–6 carbon alkyl radical, and AlR$_2$H compounds can also be used.

The Al-alkyl compound is used at an Al/Ti ratio generally from 1 to 1000.

In many cases, in order to improve the stereospecificity of the catalyst, it is preferred to use, together with the Al-alkyl compound, an electron-donor compound in quantities of from about 0.01 to 0.25 moles per mole of Al-alkyl compound.

The electron-donor compound is selected preferably from the ethers, esters, silicon compounds containing at least one SiOR bound (R is a hydrocarbyl radical), and 2,2,6,6-tetramethylpiperidine.

When the solid catalyst component comprises an ester of an aromatic bicarboxylic acid such as phthalic acid, or an ester of malonic, maleic, pivalic, succinic, or carbonic acid, the electron-donor to be used together with Al-alkyl compound is selected preferably from the silicon compounds containing at least one SiOR bond. Examples of said compounds are phenyltriethoxysilane, diphenyldimethoxysilane, dicyclopentyldimethoxysilane, methyl-tert-butyldimethyoxysilane, methylcyclohexyldimethoxysilane.

When an ether selected among those described in published European patent application 361,494 is present in the catalyst component, the stereospecificity of the catalyst is sufficiently high, so that it is not necessary to use an electron-donor compound together with the Al-alkyl compound.

The polymerization of the olefins is carried out according to known methods operating in liquid phase in liquid monomer, or in a solution of the monomer in inert hydrocarbon solvent, or in gaseous phase, or also combining polymerization stages in liquid and gaseous phase.

The polymerization temperature is generally from 0° to 150° C., preferably from 60° to 100° C. The pressure is atmospheric or higher.

The catalysts are used both in homopolymerization and copolymerization of olefins. In the case of copolymers, they are used for the preparation, for example, of random crystalline copolymers of propylene with lower contents of ethylene and optionally of butene and similar higher alphaolefins, or of elastomeric copolymers of ethylene with propylene optionally containing minor amounts, i.e. 1 to 10 wt. %, preferably 3-8%, of a diene (such as butadiene and hexadiene-1,4).

The catalysts can also be used in the sequential polymerization of propylene and of mixtures of propylene and ethylene, and/or with butene and similar higher alpha-olefins to form impact grade polypropylene.

It has been found, and this constitutes a particular aspect of the invention, that the catalysts obtained from components containing ethers selected from those described in U.S. Pat. No. 4,971,937 are particularly suitable to form amorphous copolymers of ethylene with propylene optionally containing lower contents of a diene.

Before polymerization, the catalysts can be precontacted with small quantities of olefins (prepolymerization) operating either in suspension in a hydrocarbon solvent (hexane, heptane, etc.) and polymerizing at temperatures between room temperature and 60° C., thus producing a quantity of polymer between 0.5-3 times the weight of the solid catalyst component, or operating in liquid monomer thus producing a quantity of polymer up to 1000 g per g of solid component.

The following examples are given in order to illustrate the invention.

EXAMPLES

Example 1

Synthesis of the solid catalyst component 5 g of Grace Davison 952 silica with surface area of 290 $m^2/g$, porosity (measured with nitrogen) of 1.53 cc/g, $H_2O$ 4.3% by weight measured by the K. Fischer method, are introduced in a 0.350 l reactor equipped with a filtering baffle and bottom discharge, together with 40 ml hexane. While maintaining the suspension with agitation, 12 ml of a 3 molar solution of MeMgBr in ethyl ether is fed dropwise (in about 40 minutes). The suspension is then refluxed for 1 hour. It is cooled room temperature and filtered, after which the solid is washed 5 times with 120 ml aliquots of hexane. It is filtered again and the solid is dried under a nitrogen flow at 70° C. for 1.5 hours. The composition of the solid thus obtained is reported in Table 1A.

5 g of the solid component are introduced in the same reactor used previously. 200 ml of $TiCl_4$ are fed at room temperature and, while agitating, the temperature is brought quickly to 70° C., after which 2-isopropyl-2-isopentyl1,3-dimethoxypropane (DMP) is fed in such a quantity as to have a 1:3 molar ratio with respect to the Mg contained in the catalyst component.

The temperature is brought to 100° C. and the contents are heated for 2 hours. The reaction mixture is then filtered, the solid is returned to the reaction and 200 ml of $TiCl_4$ are introduced. The contents are heated at 100° C. for 2 hours. After having removed the $TiCl_4$ by filtration, the solid is washed with hexane, twice at 600° C. and 3 times at room temperature, then it is dried as indicated above. The composition of the catalyst component is reported in Table 1A.

Polymerization of propylene

Into a 4 l autoclave, equipped with thermostat and agitation system are introduced, at 30° C. in light propylene flow, 75 ml of hexane containing 7 mmoles of Al-triethyl and the quantity of catalyst component indicated in Table 1B previously precontacted for about 5 minutes. The autoclave is closed at 1.6 Nl of hydrogen are introduced. While agitating, 1.2 kg of liquid propylene are introduced, and the temperature is brought to 70° C. The autoclave is maintained under these conditions for 2 hours, after which the agitation is stopped and the unreacted propylene is quickly removed. The reaction mixture is then cooled to room temperature, the polymer is recovered and then dried in an oven at 70° C. for 3 hours in $N_2$ flow. The yield is expressed as kg polymer/g catalyst component.

The isotactic index is measured as % of polymer insoluble in xylene at 25° C. Melt index and bulk density are determined according to ASTM D-1238, condition L, and ASTM D-1895, respectively. The polymerization results are reported in Table 1B.

Examples 2-5

The polymerization is carried out according to the method and ingredients of Examples 1, except that the silica was previously calcined for 7 hours under anhydrous $N_2$ flow at temperatures of 800°, 500°, 250°, and 150° C., respectively. The composition of the catalyst component is reported in Table 1A, the polymerization results in Table 1B.

Examples 6-8

The procedure and ingredients of Example 1 are used except that silica enriched with water by treatment with a moist nitrogen flow is used.

The results relative to the catalyst component and the polymerization are reported, respectively, in Tables 1A and 1B.

Examples 9-10

The impregnation of the silica and the synthesis of the catalyst are carried out as in Example 1, except that in this case the electron-donor compound is di-isobutylphthalate and the polymerization is carried out with Al-triethyl/DPMS (diphenyldimethoxysilane) in a 20/1 molar ratio instead of with the Al-triethyl only. The polymerization results are reported in Table 1B.

Examples 11-13

The procedure and ingredients of Example 1 are used, except that the Grignard compounds listed in Table 2A are used to impregnate the silica. The polymerization result are reported in Table 2B.

Example 14 and Comparative Example 1

The procedure and ingredients of Example 1 are used except that a defective amount (Example 14) and an excess (Comparative example 1) of Grignard compound are used, respectively. The polymerization results are reported in Table 2B.

Example 15

The procedure and ingredients of Example 1 are employed using a noncalcined $SiO_2$, except that 20 mmoles of Grignard (BuMgCl) per g of silica is used. The data relative to the catalyst and polymerization are reported in Tables 2A and 2B.

Examples 16-17

The procedure and ingredients of Example 1 are used, except that high and low porosity silicas produced by PQ Corporation, types 988-1M and 850-40-5, having respectively, a surface area (BET) of 282 $m^2/g$ and porosity of 2.75 cc/g, and area of 410 $m^2/g$ and porosity of 1.37 cc/g are used to prepare the catalyst component.

The polymerization results are reported in Table 2B.

Example 18

45 mg of the catalyst component prepared according to Example 1 are used in the polymerization of ethylene with the modalities indicated hereinbelow.

Into a 2.5 l autoclave, equipped with agitation and thermostat systems, previously purged with $N_2$ and then hydrogen at 50° C., are introduced, at 45° C., 850 ml a 0.0025M Al-triisobutyl solution in anhydrous hexane. After which are fed, under light $H_2$ flow 45 mg of the catalyst component prepared as described above suspended in 150 cc of said Al-triisobutyl solution.

The autoclave is closed, the agitation started and the temperature brought quickly to 75° C. Then hydrogen is fed until the pressure reaches 4.5 bar, and subsequently ethylene until a pressure of 11.5 bar is obtained.

These conditions are maintained for 3 hours replenishing continuously the consumed ethylene. When the reaction is complete, the autoclave is vented and is cooled to room temperature.

The polymer is recovered by filtration and then dried at 70° C. for 3 hours under nitrogen flow.

The results of the polymerization are reported in Table 2B.

Examples 19-20

Into the autoclave of Example 1, previously purged with gaseous propane flow at 70° C. for 40 minutes and then cooled to 30° C., are introduced, under propane gas flow, 10 cc of anhydrous hexane containing 0.96 g of Al-triethyl and the specific quantities of catalyst components (prepared according to the procedure and ingredients of Examples 1 and 6 respectively) indicated in Table 2B.

800 g of propane are then fed while at the same time starting the agitator. The temperature is brought quickly to 75° C., and then are introduced, in succession, 2 atm of $H_2$, 250 g of butene-1 and ethylene until a pressure of 34 bar is reached.

These conditions are maintained for 2 hours replenishing continuously consumed ethylene and butene-1 with an ethylenebutene mixture 10/1 by weight. Upon completion of the reaction, the reaction is quickly degassed, and cooled to room temperature. The polymer is dried at 70° C. for 4 hours $N_2$ under atmosphere.

The results of the polymerization are reported in Table 2B.

Example 21

Into a 1.35 l steel reactor quipped with an anchor agitator and previously purged with a gaseous propylene flow at room temperature, are introduced, in a propylene stream, 5 cc of hexane containing 0.6 g of Al-triethyl and 104 mg of the catalyst component prepared according to Example 1.

Then, a mixture made up of 22.3 g of propylene, 4.4 g of ethylene, and 0.44 g of 1,4-hexadiene (76% of trans isomer) is introduced and a pressure of 11 bar is obtained.

The temperature is quickly brought to 35° C. and it is maintained under these conditions for 4 hours continuously by feeding a propylene/ethylene/1.4-hexadiene mixture in a 67/30/3 weight ratio to compensate for any pressure drop resulting from the consumption of these monomers. Upon completion of the reaction, the unreacted monomers are degassed, the autoclave is purged with $N_2$ and the polymer is recovered; the polymer is then stabilized with 0.1% of BHT and dried under nitrogen at 60° C. for 2 hours. 135 g of polymer are obtained (yield equal to 1.3 kg of polymer/g of catalyst component) in flowable spheroidal particles with following composition in weight % of ethylene/propylene/hexadiene: 35.1/63/1.9.

For the determination of the mechanical characteristics, the polymer is vulcanized (after homogenization in a calendar roll at 80° C. for 10 minutes) in a plate press at 160° C. for 30 minutes with the following formulation) percentage by weight):

| | |
|---|---|
| Polymer | 51.35 |
| ZnO | 2.57 |
| Stearic acid | 0.51 |
| FEF carbon black | 28.24 |
| 100 M Cortis oil | 14.50 |
| Tetramethylthiuram monosulfide | 0.77 |
| Mercaptobenzothiazole (MBT) | 0.39 |
| Sulfur | 0.77 |

The tension set at 100% is 8.4; the tensile strength (MPa) is 11.3, and the elongation at break is 440%.

Comparative example 2

The procedure and ingredients of Example 1 are used, except that the Mg compound is a dialkyl (BEM of Texas Alkyls). The results are reported in Tables 2A and 2B.

Comparative Example 3

The catalyst component is prepared according to the procedure and ingredients of example 1 except that a Davison 952 silica calcined at 150° C. for 7 hours is used and the treatment with TiCl$_4$ is carried out, in the absence of the electron-donor compound.

The composition of the catalyst component is reported in Table 2A.

The component is used in a propylene polymerization test using Al-triethyl/DPMS according to the methods of Examples 9-10.

The results of the polymerization are reported in Table 2B.

Example 22

5 g of Al$_2$O$_3$ of Akzo Ketjen B (pseudobohemite crystalline form) with surface area 266 m$^2$/g and porosity 0.64 cc/g (B.E.T.), and a water content (K. Fischer) = 17%, are pretreated at 100° C. under vacuum (1 hour at 100 torr + 1 hour at 10 torr) in order to bring the free-water content to 3.55% (equal to 2.04 mmoles/g Al$_2$O$_3$); and then impregnated with a 3M solution of MeMgCl in THF (6 mmoles/g Al$_2$O$_3$) according to the procedure described in Example 1. Then, following the same procedure, the treatment with TiCl$_4$ and DMP is carried out. The catalyst thus obtained is used for the polymerization of propylene according to the procedure and ingredients of Example 1 with respect to the polymerization.

Using the catalyst component thus obtained, the polymerization of propylene is carried out according to the procedure and ingredients of Example 1.

The results are reported in Tables 3A and 3B.

Example 23

The catalyst component is prepared according to the procedure and ingredients of Example 22, with the difference that in this case the Al$_2$O$_3$ is first calcined for 6 hours at 800° C. ($\gamma$ crystalline form), then exposed to air for 5 minutes in order to bring the free H$_2$O content to 4.9% (equal to 2.85 mmoles/g Al$_2$O$_3$).

The results are reported in Tables 3A and 3B.

TABLE 1A

| | PREPARATION OF THE SOLID COMPONENT | | | | | | | | | | | |
|---|---|---|---|---|---|---|---|---|---|---|---|---|
| | SiO$_2$ | | | Mg Compound | | Support (Composition in % by weight) | | | Catalyst Component (Composition in % by weight) | | | |
| Ex. No. | Pretreatment | H$_2$O (mmol/g) | —OH (mmol/g) | Type | mmoles g SiO$_2$ | Mg | Cl/Br | Ether | Ti | Mg | Cl/Br | Electron-donor type | |
| 1 | None | 2.4 | 2.5 | MeMgBr/Et$_2$O | 7.2 | 9.5 | —/30.8 | 3.8 | 3.75 | 8.4 | 26.5/8.8 | DMP$^{(1)}$ | 6.0 |
| 2 | 800° C. × 7 h | absent | 0.7 | MeMgBr/Et$_2$O | 1.08 | 1.75 | —/6.4 | 3.0 | 2.75 | 1.75 | 10/— | DMP$^{(1)}$ | 2.0 |
| 3 | 500° C. × 7 h | absent | 1.07 | MeMgBr/Et$_2$O | 1.54 | 2.9 | —/9.8 | 3.8 | 4.0 | 2.45 | 15/— | DMP$^{(1)}$ | 2.7 |
| 4 | 250° C. × 7 h | absent | 1.75 | MeMgBr/Et$_2$O | 1.8 | 3.6 | —/11.9 | 3.3 | 4.4 | 2.95 | 16.5/— | DMP$^{(1)}$ | 2.8 |
| 5 | 150° C. × 8 h | 0.05 | 2.1 | MeMgBr/Et$_2$O | 3.6 | 6.6 | —/23.9 | 4.8 | 4.2 | 6.15 | 23.1/4.9 | DMP$^{(1)}$ | 4.0 |
| 6 | +H$_2$O | 4.2 | 2.5 | MeMgBr/Et$_2$O | 8.6 | 11.5 | —/37.0 | 6.5 | 3.85 | 10.65 | 37.3/4.8 | DMP$^{(1)}$ | 4.1 |
| 7 | +H$_2$O | 5.5 | 2.5 | MeMgBr/Et$_2$O | 10.3 | n.d. | —/n.d. | 5.2 | 3.85 | 10.25 | 32.7/9.35 | DMP$^{(1)}$ | 4.8 |
| 8 | +H$_2$O | 8.9 | 2.5 | MeMgBr/Et$_2$O | 13.1 | 11.15 | —/34.8 | 3.3 | 3.75 | 10.0 | 32.6/5.25 | DMP$^{(1)}$ | 3.9 |
| 9 | None | 2.4 | 2.5 | MeMgBr/Et$_2$O | 6.0 | n.d. | n.d. | n.d. | 4.15 | 6.6 | 29.3/— | DIBP$^{(2)}$ | 6.8 |
| 10 | 800° C. × 7 h | absent | 0.7 | MeMgBr/Et$_2$O | 3.0 | 4.55 | nd/17.7 | n.d. | 4.35 | 4.1 | 32.5/— | DIBP$^{(2)}$ | 8.0 |

$^{(1)}$DMP—2-isopropyl-2-isopentyl 1,3-dimethoxypropane
$^{(2)}$DIBP—diisobutylphthalate

TABLE 2A

| | PREPARATION OF THE SOLID COMPONENT | | | | | | | | | | | |
|---|---|---|---|---|---|---|---|---|---|---|---|---|
| | SiO$_2$ | | | Mg Compound | | Support (Composition in % by weight) | | | Catalyst Component (Composition in % by weight) | | | |
| Ex. No. | Pretreatment | H$_2$O (mmol/g) | —OH (mmol/g) | Type | mmoles g SiO$_2$ | Mg | Cl/Br | ether | Ti$^{(1)}$ | Mg | Cl/Br | Electron-donor Type | |
| 11 | None | 2.4 | 2.5 | PrMgCl/Et$_2$O | 6.0 | 11.6 | 18.5/— | 3.0 | 4.25 | 9.5 | 27.6/— | DMP | 7.0 |
| 12 | None | 2.4 | 2.5 | BuMgCl/THF | 6.8 | 10.5 | 12.55/— | 14.3 | 4.45 | 7.95 | 31.6/— | DMP | 4.0 |
| 13 | None | 2.4 | 2.5 | MeMgCl/THF | 8.6 | 9.35 | 12.15/— | 14.2 | 3.9 | 7.5 | 31.8/— | DMP | 4.4 |
| 14 | None | 2.4 | 2.5 | MeMgBr/Et$_2$O | 4.3 | 5.3 | —/20.5 | 3.5 | 4.4 | 5.1 | 22.5/1.4 | DMP | 4.4 |
| 15 | None | 2.4 | 2.5 | BuMgCl/THF | 20 | 10.0 | 19.2/— | 29 | 4.95 (0.5) | 9.3 | 36.5/— | DMP | 6.2 |
| Comp. 1 | None | 2.4 | 2.5 | MeMgBr/Et$_2$O | 10.8 | 10.0 | —/31.5 | 5.5 | 4.4 (0.55) | 9.1 | 23.2/18.2 | DMP | 3.7 |
| Comp. 2 | None | 2.4 | 2.5 | BEM | 2.9 | 4.25 | — | — | 5.05 | 3.1 | 17.4/— | DMP | 1.2 |
| 16 | None | 1.64 | n.d. | MeMgBr/Et$_2$O | 7.7 | 10 | —/26.15 | 5.6 | 3.8 | 7.65 | 28/4.3 | DMP | 5.2 |
| 17 | None | 4.6 | n.d. | MeMgBr/Et$_2$O | 9.0 | 10.6 | —/34.3 | 12.0 | 4.55 | 10.3 | 36.8/3.1 | DMP | 6.4 |
| Comp. 3 | 150° C. × 7 h | 0.11 | 2.1 | MeMgCl/THF | 5.2 | 5.2 | 8.6/— | 5.8 | 6.05 (0.4) | 4.3 | 25.3/— | None | — |

$^{(1)}$. Ti$^{3+}$

TABLE 3A

| | PREPARATION OF THE SOLID CATALYST COMPONENT | | | | | | | | | | |
|---|---|---|---|---|---|---|---|---|---|---|---|
| | Al$_2$O$_3$ | | | Support | | | Catalyst Component | | | | Type of Donor |
| Ex. No. | H$_2$O mmol/g | OH mmol/g | MeMgCl mmol/g | Mg % | Cl % | THF % | Ti % | Mg % | Cl % | Donor % | |
| 22 | 2.04 | n.d. | 6.0 | 9.9 | 15.45 | 17.1 | 2.5 | 8.95 | 36.4 | 5.9 | DMP |

TABLE 3A-continued
PREPARATION OF THE SOLID CATALYST COMPONENT

| | Al$_2$O$_3$ | | | Support | | | Catalyst Component | | | | Type of |
|---|---|---|---|---|---|---|---|---|---|---|---|
| Ex. No. | H$_2$O mmol/g | OH mmol/g | MeMgCl mmol/g | Mg % | Cl % | THF % | Ti % | Mg % | Cl % | Donor % | Donor |
| 23 | 2.85 | n.d. | 6.7 | 10.3 | 15.1 | 17 | 2.5 | 9.3 | 34.4 | 6.5 | DMP |

TABLE 1B
POLYMERIZATION RESULTS

| Example No. | Catalyst Component of Example No. | Catalyst Component (mg) | Polymer (g) | Yield (kg.pol/g.cat.) | Residual Chlorine (ppm) | Xylene Insoluble % by weight | MIL (dg/min) | Bulk Density (tamped) (g/cc) |
|---|---|---|---|---|---|---|---|---|
| 1 | 1 | 21 | 555 | 26.4 | 10.2 | 96.1 | 6.6 | 0.435 |
| 2 | 2 | 24.5 | 170 | 7.0 | 13.0 | 97.1 | 4.9 | 0.35 |
| 3 | 3 | 21.5 | 240 | 11.2 | 12.0 | 97.3 | 4.2 | 0.43 |
| 4 | 4 | 27.5 | 400 | 14.5 | 9.0 | 97.8 | 5.7 | 0.43 |
| 5 | 5 | 19.8 | 440 | 22.2 | 10.3 | 97.0 | 7.4 | 0.44 |
| 6 | 6 | 19.8 | 560 | 28.2 | 12.9 | 94.5 | 8.8 | 0.415 |
| 7 | 7 | 18 | 460 | 25.2 | 11.8 | 94.9 | 14.0 | 0.42 |
| 8 | 8 | 21 | 515 | 24.5 | 13.0 | 94.0 | n.d. | n.d. |
| 9 | 9 | 27 | 345 | 12.8 | 23.8 | 95.5 | 5.5 | 0.445 |
| 10 | 10 | 57 | 465 | 8.15 | 25.7 | 96.0 | 3.2 | 0.46 |

TABLE 2B
POLYMERIZATION RESULTS

| Example No. | Catalyst Component of Example No. | Catalyst Component (mg) | Polymer (g) | Yield (kg.pol/g.cat.) | Residual Chlorine (ppm) | Xylene Insoluble % by weight | MIL (dg/min) | Bulk Density (tamped) (g/cc) |
|---|---|---|---|---|---|---|---|---|
| 11 | 11 | 25.2 | 555 | 22.0 | 12 | 97.0 | 6.2 | 0.425 |
| 12 | 12 | 22.5 | 561 | 26.0 | 10.4 | 97.0 | 12.0 | 0.445 |
| 13 | 13 | 20.8 | 500 | 24.0 | 12.5 | 96.7 | 9.1 | 0.415 |
| 14 | 14 | 21.3 | 400 | 18.8 | 11.3 | 97.1 | 5.2 | 0.45 |
| 15 | 15 | 17.2 | 450 | 26.1 | 10.1 | 97.5 | 2.5 | 0.435 |
| Comp. 1 | Comp. 1 | 25 | 283 | 11.3 | 28 | 92.5 | 13 | 0.42 |
| Comp. 2 | Comp. 2 | 38 | 120 | 3.15 | 55 | 94.5 | 13 | 0.19 |
| 16 | 16 | 20.4 | 500 | 24.5 | 10.4 | 97.7 | 8.8 | 0.46 |
| 17 | 17 | 19 | 505 | 26.5 | 14.4 | 97.1 | 6.4 | 0.345 |
| 18 | 1 | 45 | 167 | 3.7 | | | MIE—0.4 | n.d. |
| 19 | 1 | 24 | 250 | 10.4 | | | MIE—0.22 | 0.9155* |
| 20 | 6 | 20 | 244 | 12.2 | | | MIE—0.27 | 0.9165* |
| Comp. 3 | Comp. 3 | 25 | 300 | 12 | 27.5 | 85.2 | 22 | 0.33 |

*Polymer density in g/cc

TABLE 3B
POLYMERIZATION RESULTS

| Example | Catalyst Component mg | PP g | Yield Kg/g | Residual chlorine ppm | Xylene Insoluble % by weight | MIL dg/min | Bulk Density g/cc |
|---|---|---|---|---|---|---|---|
| 22 | 20 | 438 | 21.9 | 14.2 | 96.9 | 6.2 | 0.40 |
| 23 | 22 | 476 | 21.6 | 13.6 | 97.0 | 8.2 | 0.40 |

Other features, advantages and embodiments of the invention disclosed herein will be readily apparent to those exercising ordinary skill after reading the foregoing disclosure. In this regard, while specific embodiments of the invention have been described in considerable detail, variations and modifications of these embodiments can be effected without departing from the spirit and scope of the invention as described and claimed.

We claim:

1. A solid catalyst component for the polymerization of olefins comprising the reaction product of a tetravalent titanium halide or alkoxy titanium halide and an electron-donor compound with a solid obtained by reacting a metal oxide containing surface hydroxyl groups, with an organometallic magnesium compound of the formula:

$$MgR_{(2-x)}X_x$$

where R is a $C_{1-20}$ alkyl, $C_{3-20}$ cycloalkyl, $C_{6-20}$ aryl, $C_{7-20}$ aralkyl or alkaryl radical; X is a halogen, OR or COX' radical where R is as previously defined, X' is a halogen and x is a number from 0.5 to 1.5, wherein at least 80% of the titanium which is present in said catalyst component is in the tetravalent state.

2. The catalyst component of claim 1, wherein the metal oxide is selected among from the group consisting of silica, silica-alumina mixed oxides containing minor amounts of alumina, alumina and magnesium oxide.

3. The catalyst component is claim 1, where the oxide contains from 1 to 3 mmoles of hydroxyl groups per gram of oxide.

4. The component of claim 1, wherein the oxide contains up to 15 mmoles of chemically uncombined water per gram of oxide.

5. The catalyst component of claim 1, wherein the total amount of magnesium compound, titanium compound and electron-donor compound is from 5 to 60% by weight, the Mg/Ti molar ratio is from 0.5 to 8, and the molar ratio of the electron-donor compound /Mg is from 0.05 to 0.2.

6. The catalyst component of claim 1, wherein the titanium halide is titanium tetrachloride, the electron-donor compound is selected from ethers having the formula

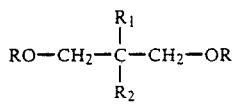

where R, $R_1$, and $R_2$, are the same or different and are linear or branched are $C_{1-18}$ alkyl, $C_{3-18}$ cycloalkyl, $C_{6-18}$ aryl, or $C_{7-18}$ alkaryl or aralkyl radicals, and $R_1$ or $R_2$ can also be hydrogen.

7. The catalyst component of claim 1, wherein the electrondonor compound is a phthalic acid ester.

8. The catalyst component of claim 1, where the organometallic magnesium compound is alkylphenyl magnesium chloride or bromide.

9. A catalyst for the polymerization of $CH_2=CHR$ olefins, wherein R is a 1-6 carbon linear or branched alkyl radical or an aryl radical, comprising the reaction product of the solid catalyst component of claim 1 with an Al-trialkyl compound.

10. The catalyst for the polymerization of olefins of claim 9 comprising the reaction product of the solid catalyst component of claim 7 with an Al-trialkyl compound and a silicon compound containing at least one Si—OR bond where R is a hydrocarbyl radical.

* * * * *